(12) United States Patent
Babu Bandarupalli et al.

(10) Patent No.: US 12,647,346 B2
(45) Date of Patent: *Jun. 2, 2026

(54) SYSTEMS, METHODS, AND APPARATUSES FOR DETERMINING DATA TRANSMISSION DESTINATIONS ACROSS AN ELECTRONIC NETWORK

(71) Applicant: BANK OF AMERICA CORPORATION, Charlotte, NC (US)

(72) Inventors: Jagadish Babu Bandarupalli, St. Johns, FL (US); Terry Lynn Miller, Huntersville, NC (US); Lubos Dunovsky, Statesville, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 82 days.

This patent is subject to a terminal disclaimer.

(21) Appl. No.: 18/886,858

(22) Filed: Sep. 16, 2024

(65) Prior Publication Data

US 2025/0007820 A1     Jan. 2, 2025

Related U.S. Application Data

(63) Continuation of application No. 18/100,247, filed on Jan. 23, 2023, now Pat. No. 12,170,609.

(51) Int. Cl.
*H04L 45/00* (2022.01)
*H04L 45/74* (2022.01)

(52) U.S. Cl.
CPC .............. *H04L 45/14* (2013.01); *H04L 45/74* (2013.01)

(58) Field of Classification Search
CPC ................................ H04L 45/14; H04L 45/74
See application file for complete search history.

(56) References Cited

U.S. PATENT DOCUMENTS

| | | |
|---|---|---|
| 7,933,996 B2 | 4/2011 | Rechterman |
| 8,275,868 B2 | 9/2012 | Rechterman |
| 9,042,384 B2 | 5/2015 | Sridharan et al. |
| 9,184,981 B2 | 11/2015 | Sarikaya |
| 9,519,500 B2 | 12/2016 | Ballani et al. |
| 9,544,185 B1 | 1/2017 | Yadav et al. |
| 9,756,121 B2 | 9/2017 | Hwang et al. |
| 9,825,851 B2 | 11/2017 | Agarwal et al. |
| 10,129,142 B2 | 11/2018 | Goliya et al. |

(Continued)

*Primary Examiner* — Bryan Y Lee
(74) *Attorney, Agent, or Firm* — Moore & Van Allen PLLC; Nicholas C. Russell

(57) ABSTRACT

Systems, computer program products, and methods are described herein for determining data transmission destinations across an electronic network. The method includes receiving a resource data packet to be transmitted to one of a plurality of data centers across a network. The resource data packet is associated with a user identifier that corresponds to one of one or more users. The method also includes determining a target data center for the resource data packet based on the user identifier associated with the resource data packet. One or more character of the user identifier associated with the resource data packet designates the target data center for the user associated with the user identifier of the resource data packet. The method further includes causing a transmission of the resource data packet to the target data center based on the user identifier associated with the resource data packet.

20 Claims, 5 Drawing Sheets

(56)               References Cited

U.S. PATENT DOCUMENTS

| | | | |
|---|---|---|---|
| 10,320,895 | B2 | 6/2019 | Puri et al. |
| 10,348,556 | B2 | 7/2019 | Cheng et al. |
| 10,505,806 | B2 | 12/2019 | Maskalik et al. |
| 10,608,844 | B2 | 3/2020 | Cidon et al. |
| 10,862,753 | B2 | 12/2020 | Hira et al. |
| 11,012,354 | B2 | 5/2021 | Taylor et al. |
| 11,102,285 | B2 | 8/2021 | Lakshminarayan et al. |
| 11,303,557 | B2 | 4/2022 | Chandrashekhar et al. |
| 2014/0149280 | A1* | 5/2014 | Karkhanis ............ G06Q 20/386 |
| | | | 705/39 |
| 2014/0241203 | A1 | 8/2014 | Elson |
| 2016/0323082 | A1 | 11/2016 | Watanabe |
| 2017/0024260 | A1 | 1/2017 | Chandrasekaran et al. |
| 2017/0099181 | A1* | 4/2017 | Hawking .............. G06F 16/972 |
| 2017/0295246 | A1 | 10/2017 | Georgiou et al. |
| 2018/0239725 | A1 | 8/2018 | Kumar et al. |
| 2020/0366592 | A1 | 11/2020 | Ehrat et al. |
| 2022/0200891 | A1 | 6/2022 | Keeler et al. |

* cited by examiner

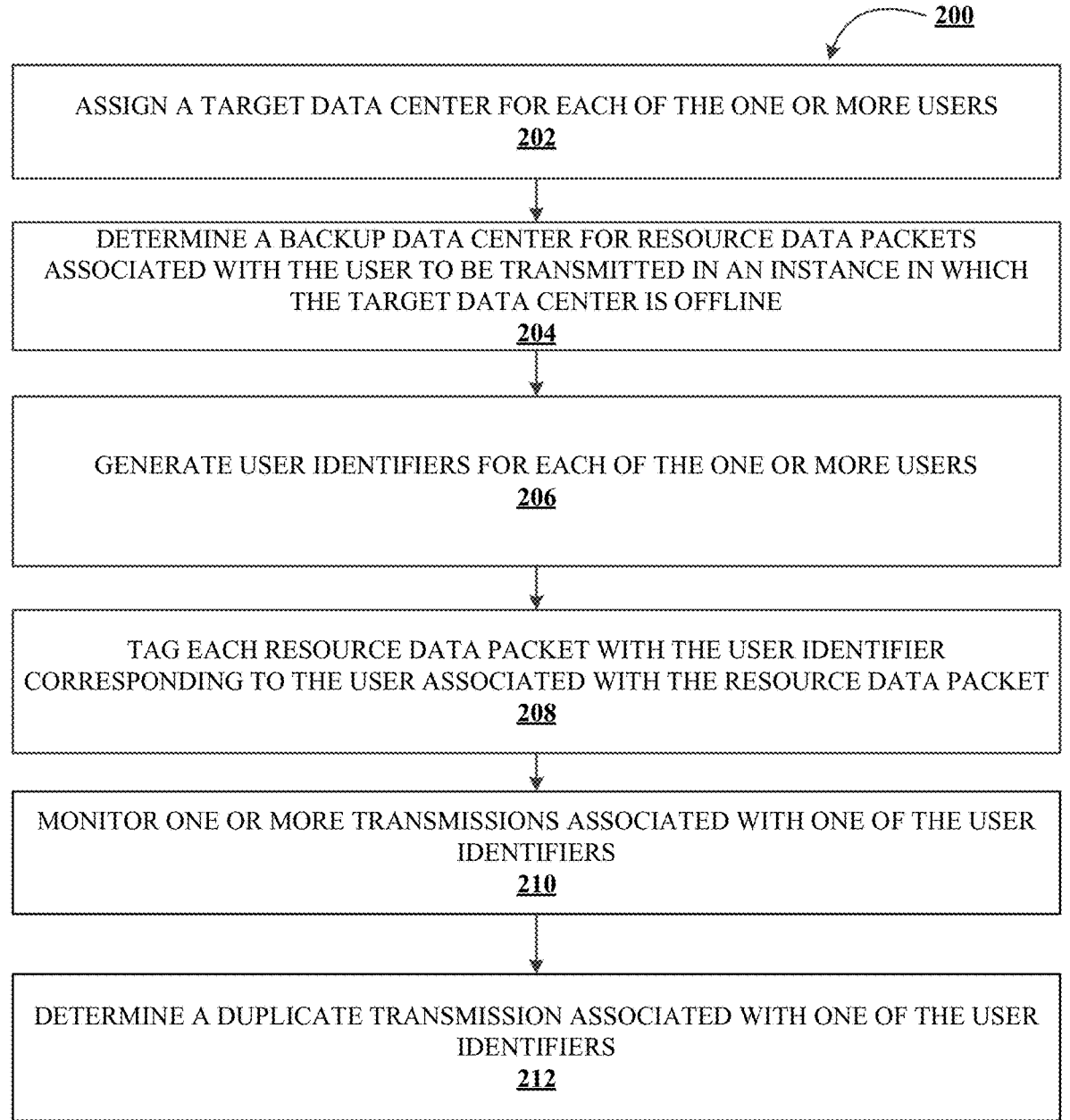

200

ASSIGN A TARGET DATA CENTER FOR EACH OF THE ONE OR MORE USERS
202

DETERMINE A BACKUP DATA CENTER FOR RESOURCE DATA PACKETS
ASSOCIATED WITH THE USER TO BE TRANSMITTED IN AN INSTANCE IN WHICH
THE TARGET DATA CENTER IS OFFLINE
204

GENERATE USER IDENTIFIERS FOR EACH OF THE ONE OR MORE USERS
206

TAG EACH RESOURCE DATA PACKET WITH THE USER IDENTIFIER
CORRESPONDING TO THE USER ASSOCIATED WITH THE RESOURCE DATA PACKET
208

MONITOR ONE OR MORE TRANSMISSIONS ASSOCIATED WITH ONE OF THE USER
IDENTIFIERS
210

DETERMINE A DUPLICATE TRANSMISSION ASSOCIATED WITH ONE OF THE USER
IDENTIFIERS
212

FIGURE 2

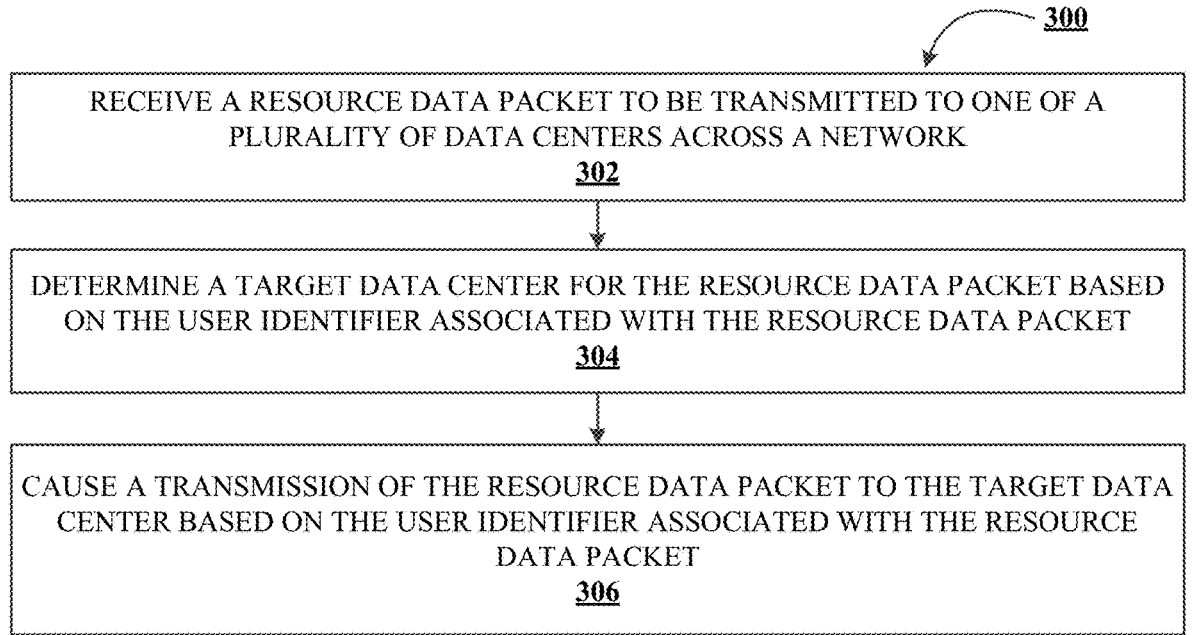

300

RECEIVE A RESOURCE DATA PACKET TO BE TRANSMITTED TO ONE OF A
PLURALITY OF DATA CENTERS ACROSS A NETWORK
302

DETERMINE A TARGET DATA CENTER FOR THE RESOURCE DATA PACKET BASED
ON THE USER IDENTIFIER ASSOCIATED WITH THE RESOURCE DATA PACKET
304

CAUSE A TRANSMISSION OF THE RESOURCE DATA PACKET TO THE TARGET DATA
CENTER BASED ON THE USER IDENTIFIER ASSOCIATED WITH THE RESOURCE
DATA PACKET
306

FIGURE 3

SYSTEMS, METHODS, AND APPARATUSES FOR DETERMINING DATA TRANSMISSION DESTINATIONS ACROSS AN ELECTRONIC NETWORK

CROSS-REFERENCE TO RELATED APPLICATION

This application is a continuation of and claims priority to U.S. patent application Ser. No. 18/100,247 filed on Jan. 23, 2023, and of the same title; the contents of which are also incorporated herein by reference.

TECHNOLOGICAL FIELD

Example embodiments of the present disclosure relate generally to data routing and, more particularly, to determining data transmission destinations across an electronic network.

BACKGROUND

Multiple data centers are often active at the same time across a network and determining data routing can be difficult to determine efficiently. As a result, there are difficulties with efficient data routing, especially in complex networks. Through applied effort, ingenuity, and innovation, many of these identified problems have been solved by developing solutions that are included in embodiments of the present disclosure, many examples of which are described in detail herein.

SUMMARY

The following presents a simplified summary of one or more embodiments of the present disclosure, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

In an example embodiment, a system for determining data transmission destinations across an electronic network is provided. The system includes at least one non-transitory storage device and at least one processing device coupled to the at least one non-transitory storage device. The at least one processing device is configured to receive a resource data packet to be transmitted to one of a plurality of data centers across a network. The resource data packet is associated with a user identifier that corresponds to one of one or more users. The at least one processing device is also configured to determine a target data center for the resource data packet based on the user identifier associated with the resource data packet. One or more character of the user identifier associated with the resource data packet designates the target data center for the user associated with the user identifier of the resource data packet. The at least one processing device is further configured to cause a transmission of the resource data packet to the target data center based on the user identifier associated with the resource data packet.

In various embodiments, the at least one processing device is configured to assign a target data center for each of the one or more users and at least one character of the user identifier for each of the one or more users corresponds to the target data center for the given user.

In various embodiments, the at least one processing device is configured to generate user identifiers for each of the one or more users. In such an embodiment, each of the one or more users have a unique user identifier and each of the user identifiers indicate the target data center for each of the one or more users.

In various embodiments, the at least one processing device is configured to tag each resource data packet with the user identifier corresponding to the user associated with the resource data packet. In various embodiments, the at least one processing device is configured to determine a backup data center for resource data packets associated with the user to be transmitted in an instance in which the target data center is offline.

In various embodiments, the at least one processing device is configured to monitor one or more transmissions associated with one of the user identifiers. In various embodiments, the at least one processing device is configured to determine a duplicate transmission associated with one of the user identifiers.

In another example embodiment, a computer program product for determining data transmission destinations across an electronic network is provided. The computer program product includes at least one non-transitory computer-readable medium having computer-readable program code portions embodied therein. The computer-readable program code portions include an executable portion configured to receive a resource data packet to be transmitted to one of a plurality of data centers across a network. The resource data packet is associated with a user identifier that corresponds to one of one or more users. The computer-readable program code portions also include an executable portion configured to determine a target data center for the resource data packet based on the user identifier associated with the resource data packet. One or more character of the user identifier associated with the resource data packet designates the target data center for the user associated with the user identifier of the resource data packet. The computer-readable program code portions further include an executable portion configured to cause a transmission of the resource data packet to the target data center based on the user identifier associated with the resource data packet.

In various embodiments, the computer program product further includes an executable portion configured to assign a target data center for each of the one or more users and at least one character of the user identifier for each of the one or more users corresponds to the target data center for the given user.

In various embodiments, the computer program product further includes an executable portion configured to generate user identifiers for each of the one or more users. In such an embodiment, each of the one or more users have a unique user identifier and each of the user identifiers indicate the target data center for each of the one or more users.

In various embodiments, the computer program product further includes an executable portion configured to tag each resource data packet with the user identifier corresponding to the user associated with the resource data packet. In various embodiments, the computer program product further includes an executable portion configured to determine a backup data center for resource data packets associated with the user to be transmitted in an instance in which the target data center is offline.

In various embodiments, the computer program product further includes an executable portion configured to monitor one or more transmissions associated with one of the user identifiers. In various embodiments, the computer program product further includes an executable portion configured to determine a duplicate transmission associated with one of the user identifiers.

In still another example embodiment, a computer-implemented method for determining data transmission destinations across an electronic network is provided. The method includes receiving a resource data packet to be transmitted to one of a plurality of data centers across a network. The resource data packet is associated with a user identifier that corresponds to one of one or more users. The method also includes determining a target data center for the resource data packet based on the user identifier associated with the resource data packet. One or more character of the user identifier associated with the resource data packet designates the target data center for the user associated with the user identifier of the resource data packet. The method further includes causing a transmission of the resource data packet to the target data center based on the user identifier associated with the resource data packet.

In various embodiments, the method also includes assigning a target data center for each of the one or more users and at least one character of the user identifier for each of the one or more users corresponds to the target data center for the given user.

In various embodiments, the method also includes generating user identifiers for each of the one or more users. In such an embodiment, each of the one or more users have a unique user identifier and each of the user identifiers indicate the target data center for each of the one or more users.

In various embodiments, the method also includes tagging each resource data packet with the user identifier corresponding to the user associated with the resource data packet. In various embodiments, the method also includes determining a backup data center for resource data packets associated with the user to be transmitted in an instance in which the target data center is offline.

In various embodiments, the method also includes monitoring one or more transmissions associated with one of the user identifiers. In various embodiments, the method also includes determining a duplicate transmission associated with one of the user identifiers.

The features, functions, and advantages that have been discussed may be achieved independently in various embodiments of the present disclosure or may be combined with yet other embodiments, further details of which can be seen with reference to the following description and drawings.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

FIG. 2 illustrates a process flow for generating a user identifier for one or more users for use in determining data transmission destinations across an electronic network, in accordance with various embodiments of the present disclosure; and FIG. 3 illustrates a process flow for determining data transmission destinations across an electronic network, in accordance with various embodiments of the present disclosure.

DETAILED DESCRIPTION

Figure 1A:
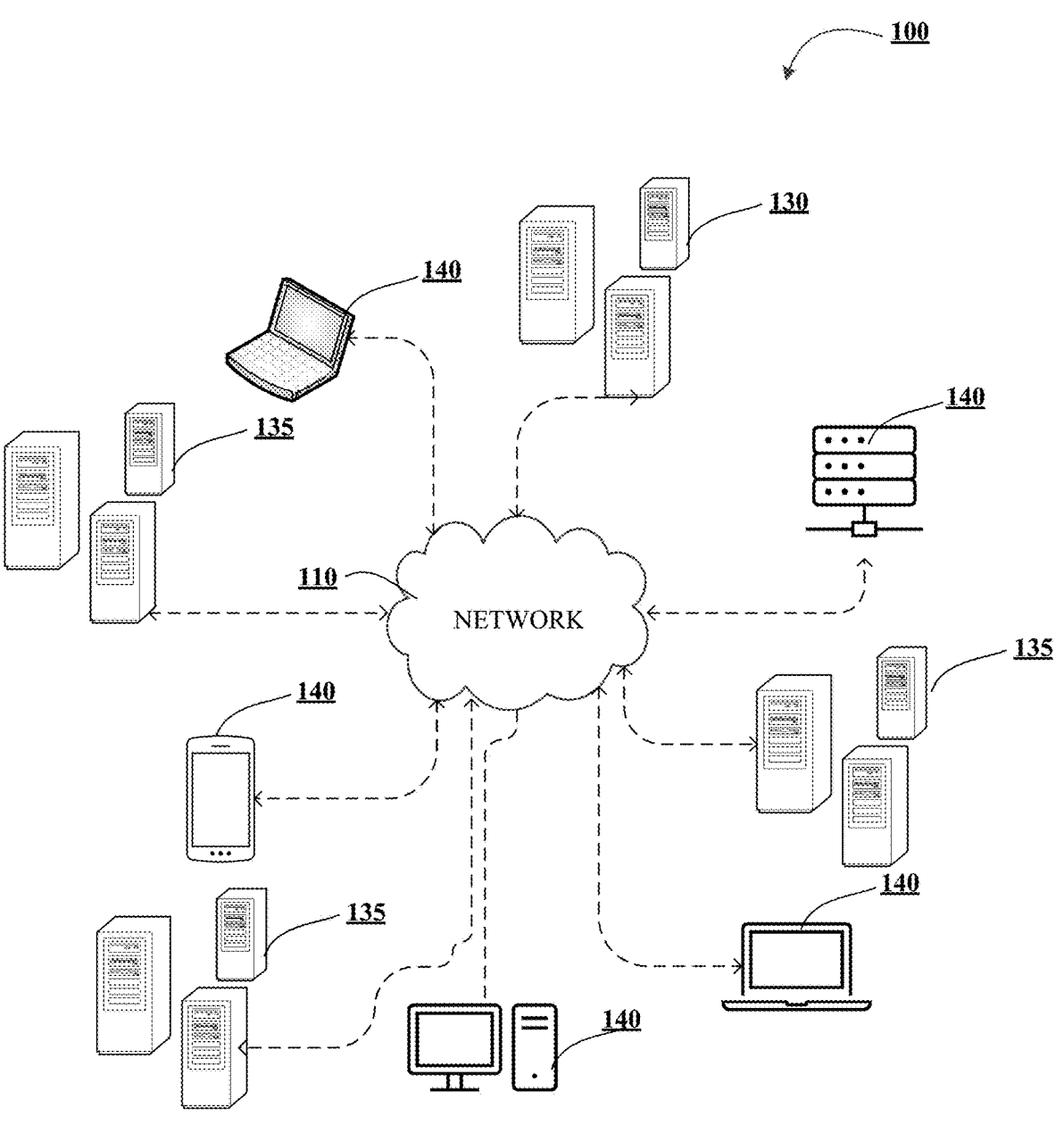
FIGS. 1A-1C illustrates technical components of an exemplary distributed computing environment for determining data transmission destinations across an electronic network, in accordance with various embodiments of the present disclosure.

Embodiments of the present disclosure will now be described more fully hereinafter with reference to the accompanying drawings, in which some, but not all, embodiments of the disclosure are shown. Indeed, the various inventions may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships, or potential future relationships with an entity (e.g., such as a customer or user of a network). In some embodiments, the user may be an employee (e.g., an associate, a project manager, an IT specialist, a manager, an administrator, an internal operations analyst, or the like) of the entity or enterprises affiliated with the entity. Additionally, in some instances, a "user" may be an entity itself (e.g., a company that has an account on the network).

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure, and positioning (distal phalanges, intermediate phalanges, proximal phalanges, and the like)), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Managers in an electronic network, especially managers which manage multiple data centers acting at the same time or at similar times sometimes have difficulty ensuring the data is being transmitted efficiently. Various data centers may include information relating to a resource data packet and therefore data needs to be transmitted from and/or to the given data center to allow for the transmission to be successful or more efficiently. However, data is often transmitted between various data centers without regard to the target data center. The amount of data processing and transmission occurring across data centers can make this even more difficult to monitor.

Various embodiments of the present disclosure provide a system for determining data transmission destinations across an electronic network. The data is routed correctly by generating a unique user identifier for each user (or account). The user identifier includes one or more characters that can indicate information relating to the user, such as user information, account information, target data center, backup data center(s), and/or the like. The user identifier is included with any potential transmission on the network, such that the user can be identified for each transmission and the target data center can also be identified. The data transmission can then be routed to the target data center.

For example, a peer-to-peer resource sharing network may receive and/or transmit a request for a resource transaction (e.g., a potential transmission request) from an endpoint device(s) 140 and/or the like. The request for the resource transaction includes the user identifier that can be used to determine the target data center to transmit the data. The user identifier may also be used to monitor transmissions on the user (or account) level. For example, the system can monitor for duplicate transmissions by the same user. The present disclosure provides a solution to issues with large scale resource management and data transmission. Namely, various embodiments of the present disclosure provide automated data transmission tracking and routing across a network in real-time or near real-time.

Figure 1B:
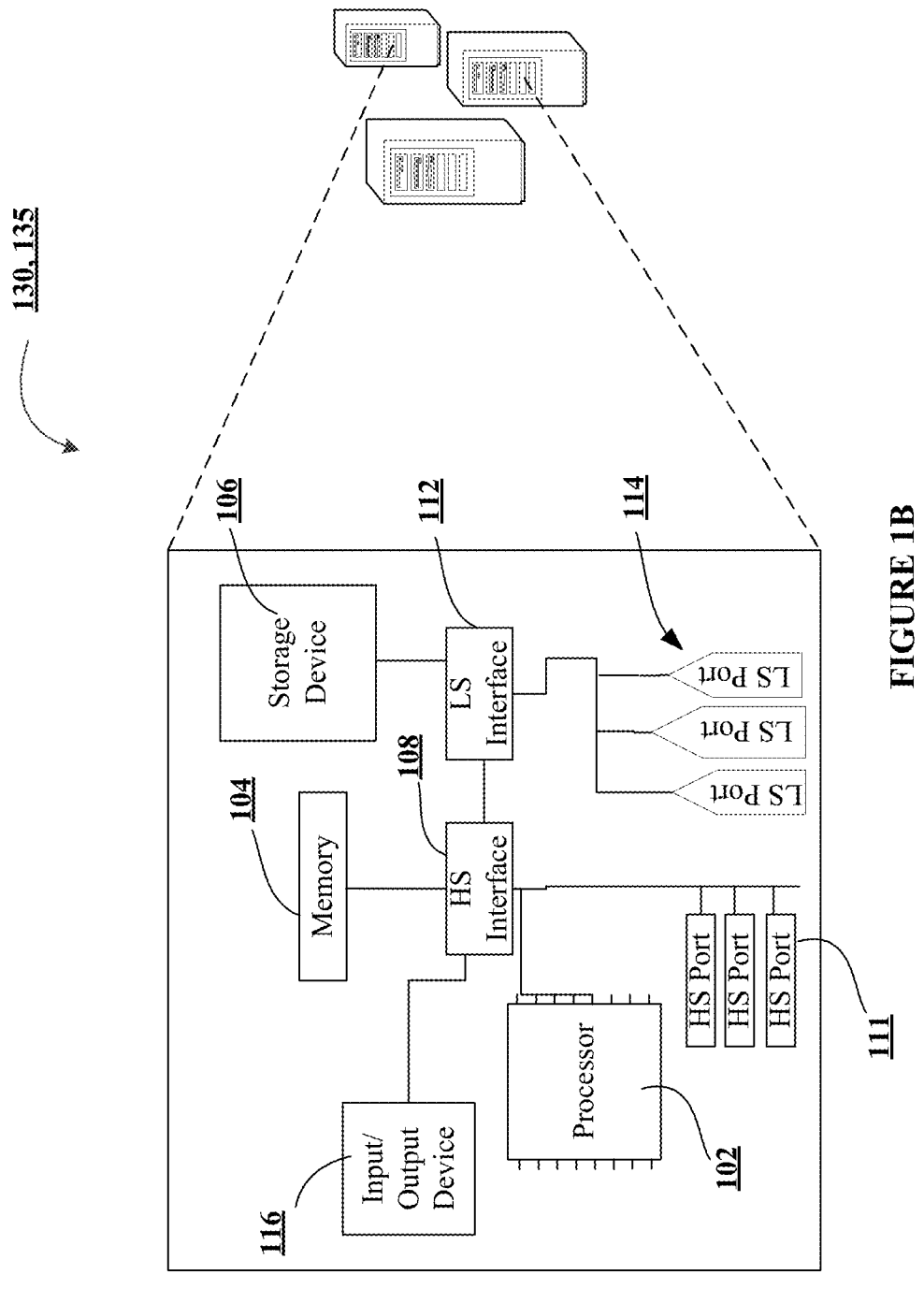
Figure 1C:
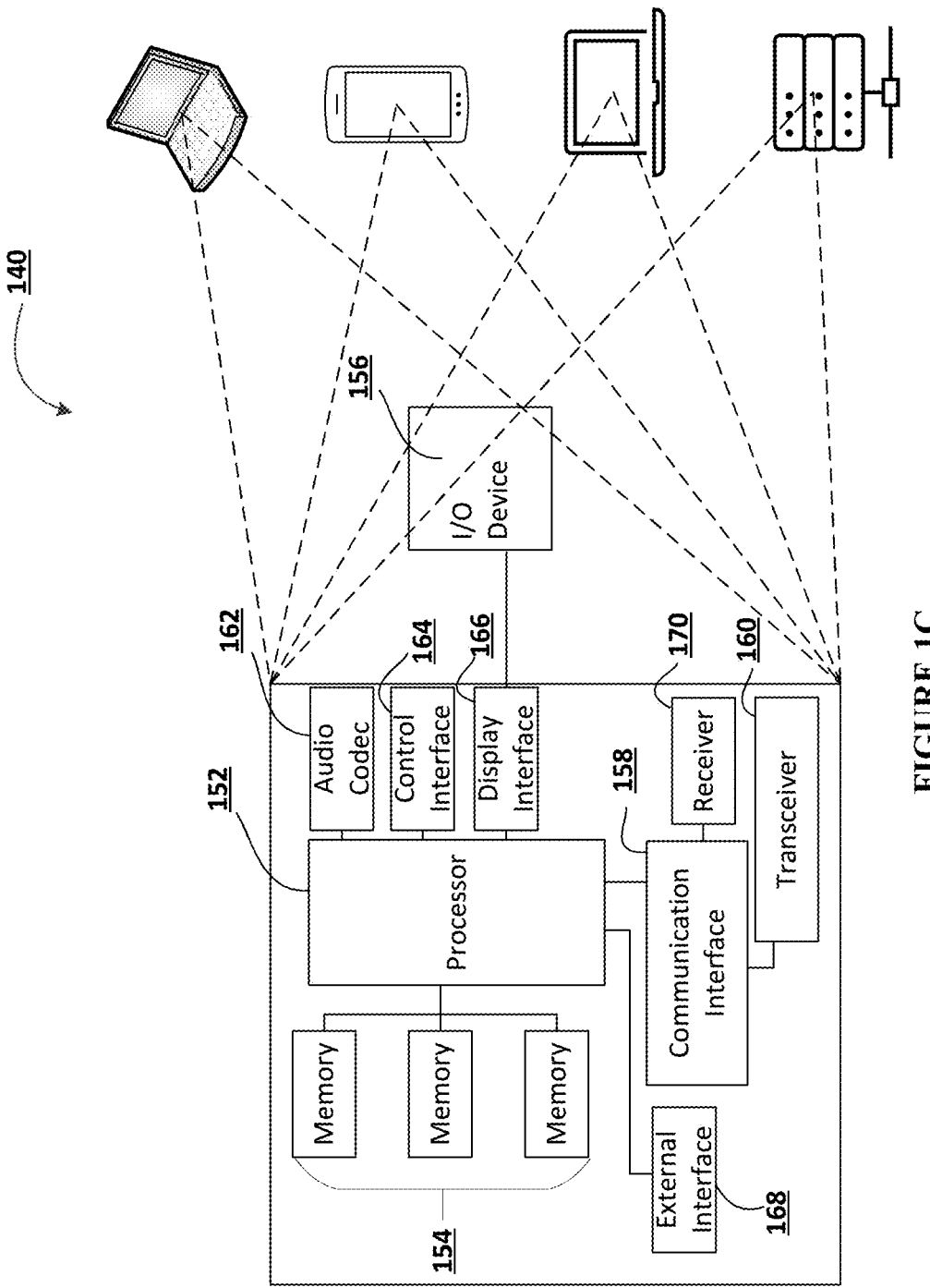

FIGS. 1A-1C illustrate technical components of an exemplary distributed computing environment for determining data transmission destinations across an electronic network, in accordance with various embodiments of the present disclosure, in accordance with an embodiment of the disclosure. As shown in FIG. 1A, the distributed computing environment 100 contemplated herein may include a system 130 (e.g., a data routing system), one or more data centers 135, an end-point device(s) 140, and a network 110 over which the system 130, data centers 135, and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, data center, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The data center(s) 135 (or "datacenter") may be part of, or in communication with, the system 130. The data centers 135 may be configured to transmit, process, and/or store data across the network 110. A data center 135 may include one or more servers, just as the system 130. In some embodiments, one or more data centers 135 may share component(s) with the system 130 (e.g., the system 130 may share a processor with one or more data centers). Additionally or alternatively, the data center(s) 135 may be distinct from, but in communication with, the system 130 via the network 110. The data center(s) 135 may be stored in different locations (e.g., a data center in a given location may have one or more servers discussed herein). Additionally, the data center(s) 135 may be individual servers of a singular data center (e.g., one or more racks of a data center may be an individual data center). Alternatively, the data center(s) 135 may have distinct physical locations from one another. The location of the data center(s) 135 discussed herein may refer to either the physical location of the data centers and/or the network location of the data center (e.g., based on the order of transmission between parts of the environment 100).

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosure described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of an example system 130 and/or an example data center 135, in accordance with an embodiment of the disclosure. While discussed herein as components of the system 130, various data centers 135 may include the components discussed herein. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low-speed expansion port 114 (shown as "LS Port") and storage device 110. Each of the components 102, 104, 106 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 106, for execution within the system 130 using any subsystems described herein. It is to be understood that the system 130 may use, as appropriate, multiple processors, along with multiple memories, and/or I/O devices, to execute the processes described herein.

The memory 104 stores information within the system 130 or data center(s) 135. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 106, or memory on processor 102.

The high-speed interface 108 manages bandwidth-intensive operations for the system 130, while the low-speed interface 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed interface 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other. Additionally, one or more components of the system 130 and the one or more data centers 135 may also be combined to achieve the processes discussed herein.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a micro-drive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single in Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process)

with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location—related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130, data center(s) 135, and end-point device(s) 140, and techniques described here can be realized in digital electronic circuitry, integrated circuitry, specially designed ASICs (application specific integrated circuits), computer hardware, firmware, software, and/or combinations thereof.

FIG. 2 is a flow chart 200 that illustrates an example method of generating a user identifier for one or more users for use in determining data transmission destinations across an electronic network, in accordance with various embodiments of the present disclosure. The method may be carried out by various components of the distributed computing environment 100 discussed herein (e.g., the system 130, the one or more data centers 135, one or more end-point devices 140, etc.). An example system may include at least one non-transitory storage device and at least one processing device coupled to the at least one non-transitory storage device. In such an embodiment, the at least one processing device is configured to carry out the method discussed herein.

Referring now to Block 202 of FIG. 2, the method includes assigning a target data center for each of the one or more users. In a network (e.g., network 110), a plurality of data centers 135 may be connected and can receive and/or transmit data amongst the network. Users of the network (e.g., peer-to-peer resource sharing networks) may use the network to transmit data multiple times and therefore, the system may be more efficient by routing transmissions involving an account associated with a user through the same data center. For example, a target data center may have information relating to the user or account associated with the user that allows for the transmission to be more efficient.

The system is configured to assign a target data center for one or more of the users on the network. In various embodiments, each user of the network may be assigned an individual target data center out of the plurality of data centers. While some users may have the same target data center, the target data center selection is on an individual (or account) level basis (e.g., each user has a specific target data center). The system is configured to route all resource data packets associated with a given user identifier to the same target data center.

The target data center may be selected for a user based on user location (e.g., residence location, end-point device 140 location, etc.), previous transmissions across the network (e.g., one of the data centers may have previously transmitted data associated with the user), data center bandwidth (e.g., some users may have larger transmission that require specific data centers with the capacity and/or availability), transmission history (e.g., users may send resources to other users in similar locations over time), and/or the like. For example, a target data center may be selected based on physical or network proximity to the location of an end-point device associated with the user.

Referring now to Block 204 of FIG. 2, the method includes determining a backup data center for resource data packets associated with the user to be transmitted in an instance in which the target data center is offline. In various embodiments, the system may determine one or more backup data centers that are used in an instance in which the target data center for the user is offline. The backup data center(s) may be capable of providing similar or the same transmission efficiency as the target data center. In some embodiments, each data center may have one or more backup data centers designated for instances in which the data center is offline (e.g., for maintenance, repair, and/or the like).

In various embodiments, a backup data center is used to divert transmission of the data intended for the target data center in an instance in which the target data center is offline. Data centers may be temporarily and/or permanently brought offline for maintenance, upgrade, replacement, and/or the like. In such an instance, the target data center may not be operational to complete a given transmission. As such, a backup data center may be determined and used to process the transmission (e.g., the data would travel through the backup data center instead of the target data center).

The selection of the backup data center(s) may be based on similarities to the target data center, capacity, data center location, network priority, and/or the like. The backup data center may be a data center typically used in the network or the backup data center may be a replacement data center (e.g., brought online during the time in which the target data center is offline). The backup data center may merely be one or more additional servers within the target data center (e.g., one server of a data center may be brought offline, and the rest of the data center may remain operational). In various embodiments, a user may not be assigned a backup data center and in an instance in which the target data center for the user is offline, the transmission is routed through the network without any specific data center priority (e.g., the transmission may be routed to the first data center available for transmitting the data).

Referring now to Block 206 of FIG. 2, the method includes generating user identifiers for each of the one or more users. The user identifier is a unique identification value including one or more characters. Each user of the network may have a unique user identifier, such that resource data packet (e.g., transmissions) can be tracked on a user (and/or account) level. For example, transmissions can be tracked as the user identifier indicates the user involved in the transmission (e.g., the sending user). In various embodiments, the user may be assigned a user identifier during an onboarding process (e.g., for a peer-to-peer resource sharing network, the user identifier may be generated in an instance in which a user creates an account on the network). In some embodiments, a user may have multiple user identifiers for multiple accounts (e.g., each account may have a user identifier). In such an embodiment, at least a portion of the user identifier may be the same across the user identifiers for the same user (e.g., characters corresponding to the user may be the same, while characters corresponding to the account and/or target data center may be different).

The user identifier may include one or more characters that indicate information relating to the user, the user account(s), and/or transmission. For example, the user identifier may indicate a user (e.g., a user number or other identifier), one or more accounts of the user, the target data center, one or more backup data centers, and/or the like. In an example embodiment, the user identifier may be one or more alphanumerical characters (e.g., a string of hexadecimal characters) with each character (or sub-set of characters) corresponding to a different indicator (e.g., one or more characters may indicate the user, one or more characters may indicate the target data center, one or more characters may indicate any backup data centers, etc.). In various embodiments, at least one of the one or more characters correspond to the target data center for the given user.

The user identifier may also be encrypted and/or otherwise secured to prevent tampering and/or malfeasance. For example, the user identifier may be encrypted (e.g., using a hash function) and the decrypted value indicates the target data center associated with the user. In such an instance, one or more entities in the network may be capable of decrypting the resource data identifier. In such an instance, the resource data identifier can securely be transmitted across the network 110.

Referring now to Block 208 of FIG. 2, the method includes tagging each resource data packet with the user identifier corresponding to the user associated with the resource data packet. Upon generation, the user identifier may be transmitted or otherwise provided to one or more end-point devices 140 associated with the given user. As such, any transmission initiated by the user (e.g., initiated by the end-point device 140 associated with the user) may be tagged (or otherwise marked) with the user identifier of the user. For example, in a peer-to-peer resource sharing network, any transmission of a resource (e.g., transaction request initiated by a user) may include the user identifier for the user sending the resource. In various embodiments, any resource data packets transmitted across the network may require a user identifier to be process. The user identifier may be included in the resource data packet in various forms, such as metadata, inclusion in file name or heading, and/or the like.

As discussed below in reference to Block 302 of FIG. 3, the resource data packet may include data to be transmitted and/or information relating to the data to be transmitted across a network 110. For example, the resource data packet may include routing information, account details, transmission history, account and/or user credentials, account limits, and/or the like associated with data to be transmitted across the network 110. In some instances, the resource data packet may include at least a portion of the associated data to be transmitted. Additionally or alternatively, the resource data packet may include information to locate and/or access the data to be transmitted. For example, in a peer-to-peer resource sharing network, a resource data packet may include the user identifier, transaction details (e.g., account information, transaction amount, receiving user or entity information), and/or the like.

Referring now to Block 210 of FIG. 2, the method includes monitoring one or more transmissions associated with one of the user identifiers. The monitoring may be completed in real-time or near-real time. Alternatively, the monitoring may be done retrospectively (e.g., periodically, such as monthly). In various embodiments, the system is configured to monitor transmission based on the user identifiers. As such, the transmissions may be logged by the system with the user identifier for each transmission being logged along with other transmission information (e.g., transaction amount, routing information, date/time, etc.). As such, the logs may be sortable by user identifier, such that one or more transmissions by a given user identifier may be monitored for potential errors and/or malfeasance. For example, the transmission associated with the user identifier may be compared to historical data (e.g., of the same or similar users) to determine if any anomalies exist in the transmission. For example, the size and/or amount of a transmissions may be higher than usual, indicating that a potential malfeasance may be occurring. Various other tracking methods may be used on the user and/or account level due to the implementation of the user identifier.

Referring now to optional Block 212 of FIG. 2, the method includes determining a duplicate transmission associated with one of the user identifiers. A duplicate transmission may be determined based on the monitoring of the transmission based on user identifiers. Duplicate transmission may be determined based on similarities between transmissions associated with the same user identifier, such as time of transmission, amount of transmission (e.g., resource transmitting amount), recipient, and/or the like. In response to determining a duplicate transmission may be occurring, the system may be configured to cancel duplicate transmission (e.g., if the duplicate transmission is identified before being processed), restrict user account access (e.g., limit user access until the account is secure), prompt the user to confirm or deny the transmissions, require enhanced authentication processes, and/or the like.

A duplicate transmission alert may be generated based on the determination of the potential duplicate transmission. The duplicate transmission alert may include providing a notification to the user associated with the user identifier of a potential duplicate transmission. In some instances, the duplicate transmission alert may notify the user that the duplicate transmission was cancelled. Alternatively, the duplicate transmission alert may prompt the user to indicate whether the potential duplicate transmissions were actually duplicate transmissions (e.g., the user can confirm that the transmission were duplicate, and the duplicate transmission may be cancelled or the user can confirm that the transmission were not duplicate and the transmission will be processed as requested).

FIG. 3 is a flow chart 300 that illustrates an example method of determining data transmission destinations across an electronic network, in accordance with various embodiments of the present disclosure. The method may be carried out by various components of the distributed computing environment 100 discussed herein (e.g., the system 130, the one or more data centers 135, one or more end-point devices 140, etc.). An example system may include at least one non-transitory storage device and at least one processing device coupled to the at least one non-transitory storage device. In such an embodiment, the at least one processing device is configured to carry out the method discussed herein.

In various embodiments, the method and features of the flow chart 200 of FIG. 2 and flow chart 300 of FIG. 3 may be carried out by the same system and/or components of a system (e.g., system 130). For example, the system 130 may generate the user identifier for each user and then determine the target data center to transmit a resource data packet. Additionally, one or more other components of the environment may also carry out one or more of the operations. For example, the system 130 may generate the user identifier and an end-point device 140 associated with a user may tag each resource data packet with the user identifier for the given user.

Referring now to Block 302 of FIG. 3, the method includes receiving a resource data packet to be transmitted to one of a plurality of data centers across a network. A resource data packet may include data to be transmitted and/or information relating to the data to be transmitted across a network 110. For example, the resource data packet may include routing information, account details, transmission history, account and/or user credentials, account limits, and/or the like associated with data to be transmitted across the network 110. In some instances, the resource data packet may include at least a portion of the associated data to be transmitted. Additionally or alternatively, the resource data packet may include information to locate and/or access the data to be transmitted. As discussed herein, the resource data packet includes a user identifier used to identify the user and/or the target data center for the transmission.

The resource data packet may be initiated by an end-point device 140 associated with the user. Referring back to the example using the peer-to-peer resource sharing network, a user may be seeking to transmit a resource from an account associated with the user to another user (e.g., an account associated with the receiving user) and the resource data packet may be a data packet transmitted by the end-point device 140 over the network with information relating to the transmission (e.g., resource amount, account information, routing information, etc.) to initiate the transmission.

Referring now to Block 304 of FIG. 3, the method includes determining a target data center for the resource data packet based on the user identifier associated with the resource data packet. As discussed above, each user identifier indicates a target data center and as such the target data center is obtained from the user identifier included in the resource data packet. As discussed above, one or more characters of the user identifier designates the target data center for the user associated with the user identifier and therefore the target data center is determined based on the corresponding character(s). The user identifier may also be used to identify the user, account(s) associated with the user, backup data center(s), and/or the like. The user identifier may also be encrypted, such that the target data center is determined upon decrypting the user identifier.

In an instance in which the target data center is offline, the method may include determining the backup data center(s) based on the user identifier. In such an instance, the backup data center(s) are treated as the target data center for the operations while the actual target data center is offline (e.g., the resource data packet is transmitted to the backup data center).

Referring now to Block 306 of FIG. 3, the method includes causing a transmission of the resource data packet to the target data center based on the user identifier associated with the resource data packet. The target data center may then process the resource data packet and cause execution of the transmission. For example, the target data center may initiate the actual resource transfer between accounts in a peer-to-peer resource sharing network. In an instance in which the resource data packet includes all of the data to be transmitted, the target data center may merely route the transmission to an intended destination. Alternatively, in an instance in which the resource data packet includes information relating to the data to be transmitted (e.g., routing information, resource location, etc.), the target data center may receive and/or request the data to be transmitted. In an example embodiment, the target data center may have at least a portion of the data stored in the data center (e.g., the resource may be stored at the target data center), and the target data center may be able to access the stored data.

As will be appreciated by one of ordinary skill in the art, various embodiments of the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system." Furthermore, embodiments of the present disclosure may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present disclosure, however, the computer-readable medium may be transitory, such as a propagation signal including computer-executable program code portions embodied therein.

It will also be understood that one or more computer-executable program code portions for carrying out the specialized operations of the present disclosure may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present disclosure are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present disclosure are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present disclosure.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for determining data transmission destinations across an electronic network, the system comprising:

at least one non-transitory storage device comprising computer instruction code stored on a non-transitory computer-readable medium; and at least one processing device coupled to the at least one non-transitory storage device, wherein the at least one processing device is configured to:

assign a target data center of a plurality of data centers for each of one or more users, wherein the target data center assigned for each of the one or more users is to be the target data center for resource data packets that are associated with a given user;

assign a user identifier to each of the one or more users, wherein the user identifier comprises information regarding the target data center assigned to a given user;

receive the resource data packet to be transmitted to one of the plurality of data centers across a network, wherein the resource data packet is associated with a user identifier that corresponds to one of the one or more users;

extract from the user identifier for the user associated with the resource data packet data that identifies a target data center associated with the user;

tag each resource data packet with the user identifier corresponding to the user associated with the resource data packet, wherein the tag is used to determine the target data center for the resource data packet;

determine the target data center for the resource data packet is not available, and in response to target data center unavailability, reassign the resource data packet without a data center prioritization to a first available alternate data center;

cause a transmission of the resource data packet to a first available alternate data center based on the user identifier associated with the resource data packet and the resource data packet being tagged, and the unavailability of the target data center; and process the received resource data packet at the first available alternate data center, wherein processing comprises determining whether a subset of the data within the resource data packet is stored at the target data center and causing a retransmission of the resource data packet to an additional network location.

2. The system of claim 1, wherein assigning a target data center of a plurality of data centers for each of one or more users is assigned based on one or more previous transmissions of one or more previous resource data packets associated with the one or more users.

3. The system of claim 1, wherein the at least one non-transitory storage device further comprises computer instruction code to cause at least one processing device to generate user identifiers for each of the one or more users, wherein each of the one or more users have a unique user identifier.

4. The system of claim 1, wherein the at least one non-transitory storage device further comprises computer instruction code to cause at least one processing device to, after extracting from the user identifier for the user associated with the resource data packet data that identifies a target data center associated with the user, determine the target data center for the resource data packet based on the user identifier associated with the resource data packet, wherein one or more character of the user identifier associated with the resource data packet designates the target data center for the user associated with the user identifier of the resource data packet.

5. The system of claim 1, wherein the at least one non-transitory storage device further comprises computer instruction code to cause at least one processing device to determine a backup data center for resource data packets associated with the user to be transmitted in an instance in which the target data center is offline.

6. The system of claim 1, wherein the at least one non-transitory storage device further comprises computer instruction code to cause at least one processing device to monitor one or more transmissions associated with one of the user identifiers.

7. The system of claim 6, wherein the at least one non-transitory storage device further comprises computer instruction code to cause at least one processing device to determine a duplicate transmission associated with one of the user identifiers.

8. A computer program product for determining data transmission destinations across an electronic network, the computer program product comprising at least one non-transitory computer-readable medium having computer-readable program code portions embodied therein, the computer-readable program code portions comprising one or more executable portions configured to:

assign a target data center of a plurality of data centers for each of one or more users, wherein the target data center assigned for each of the one or more users is to be the target data center for resource data packets that are associated with a given user;

assign a user identifier to each of the one or more users, wherein the user identifier comprises information regarding the target data center assigned to a given user;

receive the resource data packet to be transmitted to one of the plurality of data centers across a network, wherein the resource data packet is associated with a user identifier that corresponds to one of the one or more users;

extract from the user identifier for the user associated with the resource data packet data that identifies a target data center associated with the user;

tag each resource data packet with the user identifier corresponding to the user associated with the resource data packet, wherein the tag is used to determine the target data center for the resource data packet;

determine the target data center for the resource data packet is not available, and in response to target data center unavailability, reassign the resource data packet without a data center prioritization to a first available alternate data center;

cause a transmission of the resource data packet to a first available alternate data center based on the user identifier associated with the resource data packet and the resource data packet being tagged, and the unavailability of the target data center; and process the received resource data packet at the first available alternate data center, wherein processing comprises determining whether a subset of the data within the resource data packet is stored at the target data center and causing a retransmission of the resource data packet to an additional network location.

9. The computer program product of claim 8, wherein the computer program product comprising one or more executable portions are further configured to assign a target data center of a plurality of data centers for each of one or more users is assigned based on one or more previous transmissions of one or more previous resource data packets associated with the one or more users.

10. The computer program product of claim 8, wherein the computer program product comprising one or more executable portions are further configured to generate user identifiers for each of the one or more users, wherein each of the one or more users have a unique user identifier.

11. The computer program product of claim 8, wherein the computer program product comprising one or more executable portions are further configured to, after extracting from the user identifier for the user associated with the resource data packet data that identifies a target data center associated with the user, determine the target data center for the resource data packet based on the user identifier associated with the resource data packet, wherein one or more character of the user identifier associated with the resource data packet designates the target data center for the user associated with the user identifier of the resource data packet.

12. The computer program product of claim 8, wherein the computer program product comprising one or more executable portions are further configured to determine a backup data center for resource data packets associated with the user to be transmitted in an instance in which the target data center is offline.

13. The computer program product of claim 8, wherein the computer program product comprising one or more executable portions are further configured to monitor one or more transmissions associated with one of the user identifiers.

14. The computer program product of claim 13, wherein the computer program product comprising one or more executable portions are further configured to determine a duplicate transmission associated with one of the user identifiers.

15. A computer-implemented method for determining data transmission destinations across an electronic network, the method comprising:

assigning a target data center of a plurality of data centers for each of one or more users, wherein the target data center assigned for each of the one or more users is to be the target data center for resource data packets that are associated with a given user;

assigning a user identifier to each of the one or more users, wherein the user identifier comprises information regarding the target data center assigned to a given user;

receiving the resource data packet to be transmitted to one of the plurality of data centers across a network, wherein the resource data packet is associated with a user identifier that corresponds to one of the one or more users;

extracting from the user identifier for the user associated with the resource data packet data that identifies a target data center associated with the user;

tagging each resource data packet with the user identifier corresponding to the user associated with the resource data packet, wherein the tag is used to determine the target data center for the resource data packet;

determining the target data center for the resource data packet is not available, and in response to target data center unavailability, reassign the resource data packet without a data center prioritization to a first available alternate data center;

causing a transmission of the resource data packet to a first available alternate data center based on the user identifier associated with the resource data packet and the resource data packet being tagged, and the unavailability of the target data center; and processing the received resource data packet at the first available alternate data center, wherein processing comprises determining whether a subset of the data within the resource data packet is stored at the target data center and causing a retransmission of the resource data packet to an additional network location.

16. The method of claim 15 wherein assigning a target data center of a plurality of data centers for each of one or more users is assigned based on one or more previous transmissions of one or more previous resource data packets associated with the one or more users.

17. The method of claim 15 further comprising generating user identifiers for each of the one or more users, wherein each of the one or more users have a unique user identifier.

18. The method of claim 15 further comprising, after extracting from the user identifier for the user associated with the resource data packet data that identifies a target data center associated with the user, determining the target data center for the resource data packet based on the user identifier associated with the resource data packet, wherein one or more character of the user identifier associated with the resource data packet designates the target data center for the user associated with the user identifier of the resource data packet.

19. The method of claim 15 further comprising determining a backup data center for resource data packets associated with the user to be transmitted in an instance in which the target data center is offline.

20. The method of claim 15 further comprising monitoring one or more transmissions associated with one of the user identifiers and determining a duplicate transmission associated with one of the user identifiers.

\* \* \* \* \*